United States Patent
Mo et al.

(10) Patent No.: US 7,713,199 B2
(45) Date of Patent: May 11, 2010

(54) MEDICAL DIAGNOSTIC ULTRASOUND TRANSDUCER SYSTEM FOR HARMONICS

(75) Inventors: Jian-Hua Mo, Milpitas, CA (US); Timothy L. Proulx, Santa Cruz, CA (US); Charles E. Bradley, Burlingame, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 423 days.

(21) Appl. No.: 11/192,857

(22) Filed: Jul. 28, 2005

(65) Prior Publication Data

US 2007/0038082 A1  Feb. 15, 2007

(51) Int. Cl.
*A61B 8/00* (2006.01)
(52) U.S. Cl. ...................... 600/437; 600/407
(58) Field of Classification Search ......... 600/407–480; 73/1.82
See application file for complete search history.

(56) References Cited

U.S. PATENT DOCUMENTS

| | | | |
|---|---|---|---|
| 4,550,607 A * | 11/1985 | Maslak et al. ................. | 73/626 |
| 5,446,333 A | 8/1995 | Ishida et al. | |
| 5,724,976 A | 3/1998 | Mine et al. | |
| 5,825,117 A | 10/1998 | Ossmann et al. | |
| 5,957,851 A * | 9/1999 | Hossack ..................... | 600/459 |
| 6,387,051 B1 | 5/2002 | Ragauskas et al. | |
| 6,409,667 B1 | 6/2002 | Hossack | |
| 6,416,478 B1 * | 7/2002 | Hossack ..................... | 600/459 |
| 6,537,224 B2 * | 3/2003 | Mauchamp et al. ......... | 600/459 |
| 6,673,016 B1 | 1/2004 | Bolorforosh et al. | |
| 6,905,467 B2 * | 6/2005 | Bradley et al. .............. | 600/443 |
| 2002/0156379 A1 | 10/2002 | Angelsen | |
| 2002/0188200 A1 * | 12/2002 | Mauchamp et al. ......... | 600/439 |
| 2003/0060712 A1 | 3/2003 | Kawagishi et al. | |
| 2003/0187352 A1 * | 10/2003 | Ingebrigtsen et al. ....... | 600/437 |
| 2004/0230121 A1 | 11/2004 | Hansen et al. | |
| 2006/0052699 A1 * | 3/2006 | Angelsen et al. ............ | 600/437 |

FOREIGN PATENT DOCUMENTS

| EP | 0 147 955 A2 | 7/1985 |
|---|---|---|
| WO | WO 02/29433 A2 | 4/2002 |

OTHER PUBLICATIONS

"Toshiba Medical Systems—Differential THI," Toshiba America Medical Systems: Radiology Ultrasound: Aplio: Differential THI; located at http://medical.toshiba.com/clinical/radiology/aplio-434-674-424.htm; 2 pages; printed on Jul. 18, 2005.

Toshiba Medical Systems: Differential tissue Harmonic Imaging of an Ovarian Dermoid Cyst,: Toshiba America Medial Systems: Radiology: Ultrasound Aplio: Clinical Case; located at http://medical.toshiba.com/clinical/radiology/aplio-434-685-424.htm; 3 pages; printed on Jul. 18, 2005.

* cited by examiner

*Primary Examiner*—Brian Casler
*Assistant Examiner*—Nasir Shahrestani

(57) ABSTRACT

A medical diagnostic ultrasound transducer system has at least a first and a second set of transducer layers of an element. Each set has one or more transducer layers with independent electrical access. A transmit event through a first set of transducer layers with broadband electrical signals generates acoustic signals containing at least two different frequency bands, and a receive event through a second and different set of transducer layers receives multiple tissue harmonic signals to generate a wide bandwidth response. Fundamental signals can be reduced with a pulse inversion technique through a second transmit event of inverted pulses, a second receive event and superposition of signals from the two receive events.

19 Claims, 2 Drawing Sheets

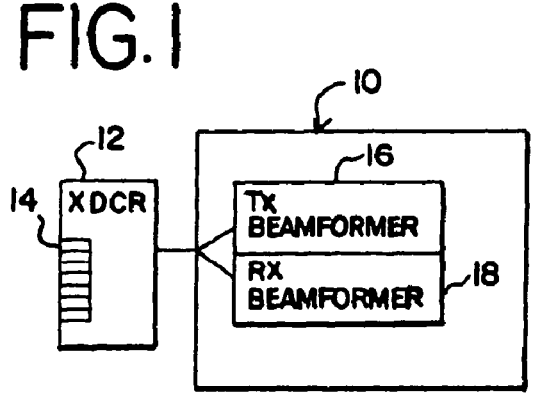
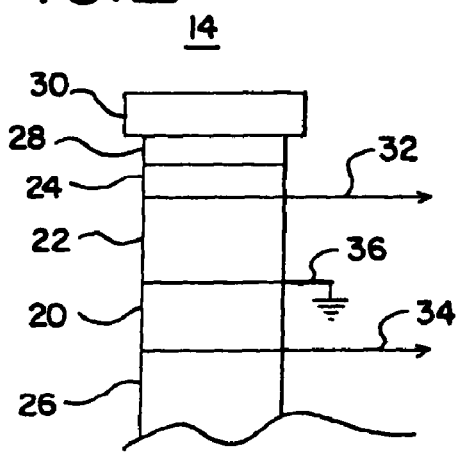
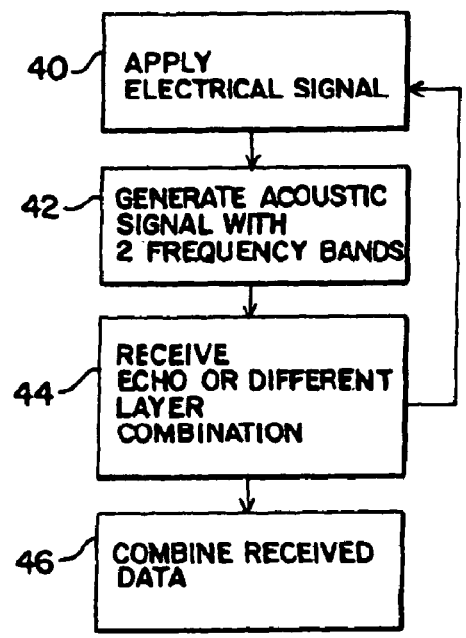
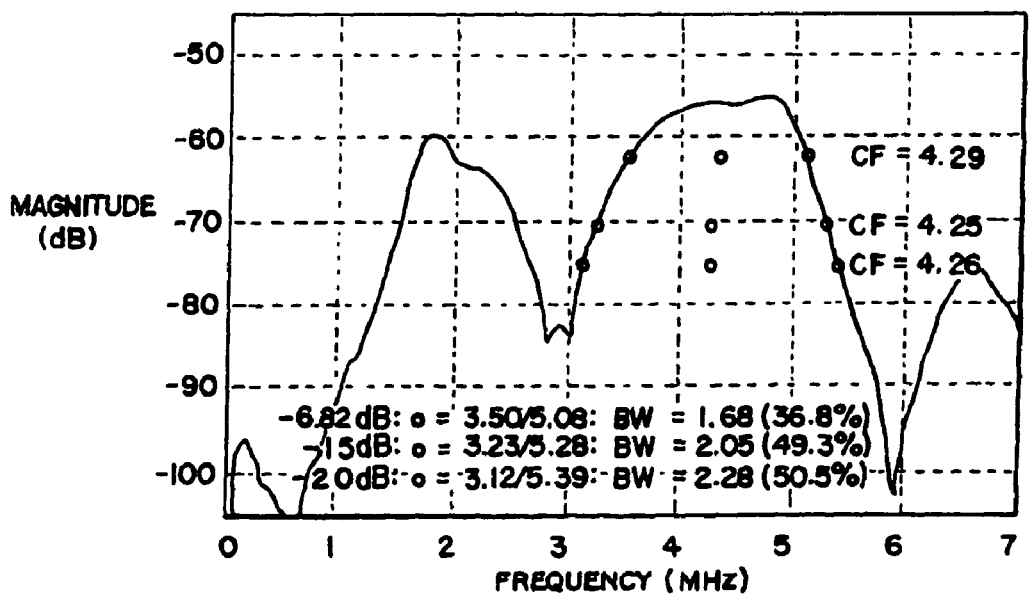

MEDICAL DIAGNOSTIC ULTRASOUND TRANSDUCER SYSTEM FOR HARMONICS

BACKGROUND

In medical diagnostic ultrasound harmonic imaging, acoustic energy is transmitted at a fundamental frequency. Echoes generated by propagation and/or reflections at a harmonic of the transmitted frequency are received. For example, a transducer generates acoustic energy in a band of frequencies centered at 2 MHz. The same transducer is used to receive the echo signals at a harmonic band of frequencies centered at the second harmonic of 4 MHz. The transducer may have a limited bandwidth, so the harmonic signals are positioned at a high end of the bandwidth. Given this bandwidth limitation, the received signals are generally narrow-band and may have weaker signal strength.

BRIEF SUMMARY

By way of introduction, the preferred embodiments described below include methods and systems for harmonic reception with ultrasound. Transmitting at different frequency bands provides wide band harmonic information for reception. The interaction of the two transmitted frequencies creates harmonics for reception. By using a transducer with multiple transducer layers, different electrical accesses are provided for the different bandwidths of transmit and reception. Wideband tissue harmonic information is received for imaging in response to transmission at different frequency bands.

Multiple transmit events are used in other embodiments. One transmit event uses a wide band pulse, providing acoustic energy at two or more frequency bands. For another transmit event, acoustic energy at one or more of the frequency bands is transmitted with the pulse or pulses inverted relative to the other transmit event. The received signals responsive to the two transmit events are combined.

In a first aspect, a method is provided for harmonic reception with ultrasound. An acoustic signal having at least first and second different frequency bands is generated in response to a broadband electrical signal. The acoustic signal is generated by a first set of transducer layers of an element with at least first and second transducer layers along a range dimension. The first set includes one or more transducer layers. An echo signal is received at a harmonic or harmonic interaction frequency of the first and second frequency bands. The receiving is performed with a second set of transducer layers where the second set is a transducer layer or combination of layers that is different than the first set.

In a second aspect, a method is provided for harmonic reception with ultrasound. A first acoustic signal having at least first and second different frequency bands is generated in response to a broadband electrical signal. A first echo signal is received at a harmonic or harmonic interaction frequency of the first and second frequency bands in response to the first acoustic signal. A second acoustic signal having the first frequency band with reduced or none of the second frequency band is generated. The second acoustic signal is inverted from the first acoustic signal at the first frequency band. A second echo signal is received in response to the second acoustic signal. The first and second echo signals are combined.

In a third aspect, a system is provided for harmonic reception with ultrasound. A transducer element has at least two transducer layers. First and second electrical connections are provided with the transducer element. The second electrical connection is for at least one different one of the at least two transducer layers. The transducer is operable to generate an acoustic signal having at least first and second different frequency bands in response to a broadband electrical signal on the first electrical connection, and to receive an echo signal at a harmonic or harmonic interaction frequency of the first and second frequency bands on the second electrical connection.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1 is a block diagram of one embodiment of a system for harmonic reception with ultrasound;

FIG. 2 is a cross sectional view of one embodiment of a transducer element for use in the system of FIG. 1;

FIG. 3 is a flow chart diagram of one embodiment of a method for harmonic reception with ultrasound;

FIG. 4 is a graphical representation of an acoustic signal spectral characteristic of one transducer layer in response to a broadband pulse at transmit in one embodiment;

DETAILED DESCRIPTION OF THE DRAWINGS AND PRESENTLY PREFERRED EMBODIMENTS

Figure 5:
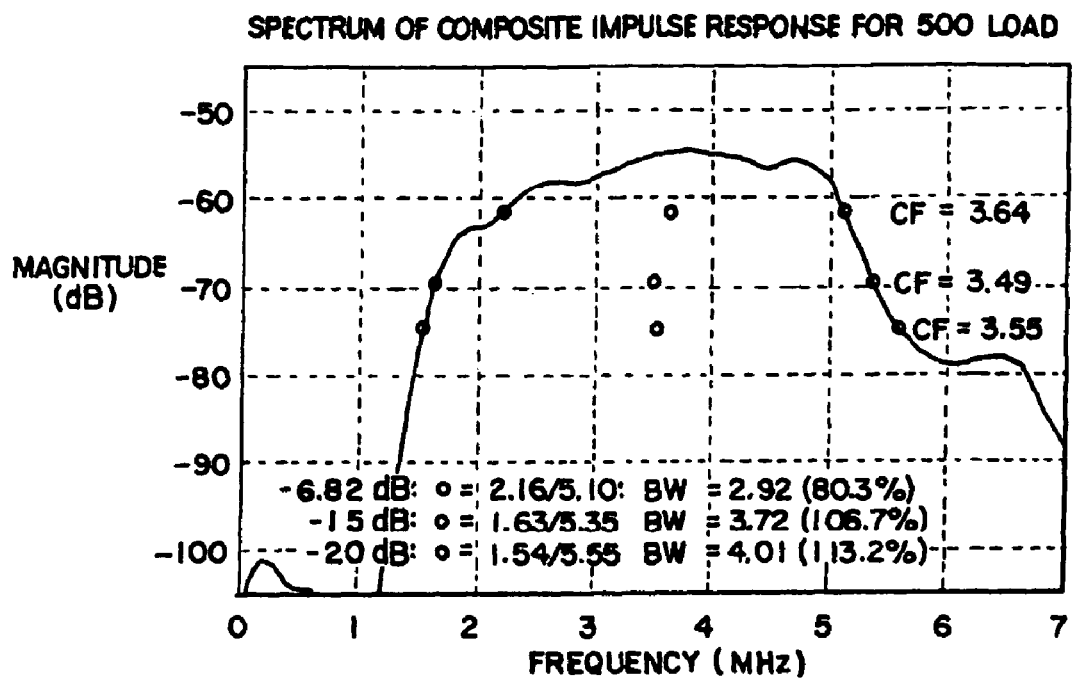
FIG. 5 is a graphical representation of an acoustic signal spectral characteristic of another transducer layer for receiving.

Wide band ultrasound energy may be used for medical diagnostic ultrasound imaging. By simultaneously transmitting at multiple center frequencies or frequency bands, harmonics generated by the interaction of the multiple frequencies may be received for wide band imaging.

In one embodiment, a multilayer transducer is used to provide for wideband imaging. One layer or combination of layers generates the multiple frequencies in response to a broadband pulse. A different layer or combination of layers receives the echoes at the desired harmonic frequencies. Independent electrical access to the different layers or combinations of layers provides for wide band reception in response to a single transmission. The transducer is designed to generate the multiple frequencies and wideband reception without a need for special electrical signal wave shaping. Fundamental signals may be reduced by pulse inversion through a subsequent transmit and receive events. In this case, the information from the first and second receive events is combined to provide the desired wide band information. In another embodiment, a second transmit event includes only inverted pulses for a subset of the transmitted frequency bands. The two receive events are filtered or otherwise manipulated to isolate information at the subset of bands. The information from the first and second receive events is combined to provide the desired subset band information. Different subset band information is further combined to provide the desired wide band information.

FIG. 1 shows a system 10 for harmonic reception with ultrasound. The system 10 includes a transducer 12 with a plurality of elements 14, a transmit beamformer 16 and a receive beamformer 18. Additional, different or fewer components may be provided, such as also providing an image processor, detector, scan converter and/or display. The system 10 is part of a medical diagnostic imaging system and/or a probe for connection with an imaging system.

The transmit and receive beamformers 16, 18 are digital or analog beamformers having a plurality of channels. The channels connect directly or switchably with respective ones or groups of elements 14 of the transducer. Two or more system channels may be connected to each element. Separate connections are provided for the transmit beamformer 16 and the receiver beamformer 18 to each element 14 in one embodiment. Alternatively, passive or active switching is provided for independent access of the transmit and receive beamformers 16, 18 to each element 14.

The transmit beamformer 16 includes a plurality of waveform generators, such as pulsers, switches, memories, analog-to-digital converters, or other now known or later developed waveform generators. The electrical signals generated for each channel are sinusoidal, square wave, unipolar, bipolar or have other shapes. Using delays, phase shift and/or amplitude adjustment across the channels, the transmit beamformer 16 focuses the acoustic energy generated in response to application of the electrical signals along one or more lines, in a plane wave or as a diverging broad wave front.

The receiver beamformer 18 delays, phase shifts, and/or amplitude adjusts the electrical signals representing received echoes. The information is then combined to form one or more beams representing the scanned area or volume. The filters, amplifiers, analog-to-digital converters, processors, multipliers or other components of the receive beamformer 18 operate on data over a desired frequency band.

The transducer 12 is a one dimensional, multi dimensional, linear, curved, phased or other now known or later developed type of ultrasound array of elements 14. In one embodiment, each element 14 of the transducer 12 is a single layer of transducer material. In another embodiment shown in FIG. 2, the elements 14 of the transducer 12 include two or more transducer layers 20, 22, 28, a backing block 26, one or more matching layers 24, 28, a lens or acoustic window 30, and electrical accesses 32, 34, 36. Additional, different or fewer components may be provided, such as additional electrical accesses or electrodes for the layer 28 operating as a transducer layer as well as a matching layer. In one embodiment, the elements 14 and transducer 12 have the structure and/or connections disclosed in U.S. Pat. Nos. 6,409,667, 6,673,016, 5,724,976, 5,446,333 or 6,416,478, the disclosures of which are incorporated herein by reference.

The element 14 is of any size and shape. For example, each element is square, triangular, rectangular, hexagonal, polygonal or other shape. In one embodiment, the element 14 is 170 µm wide (azimuth) and 13.5 mm in length (elevation). Other sizes may be provided. The backing block 26 is of any shape, material or size, such as being rubber powder mixed in epoxy 20 mm thick (range). The matching layer 24 (and/or 28) is of any shape, material or size, such as the matching layer 24 being a high impedance layer of epoxy with copper flake filler 220 µm thick and the layer 28 being a low impedance layer of epoxy 150 µm thick. The lens material 20 is of any shape, material or size with or without focus, such as RTV 1 mm thick.

The transducer layers 20, 22 (and 28 in one embodiment) are piezoelectric ceramic (PZT) blocks, piezoelectric polymers (PVDF), piezo-polymer composites, microelectromechanical (e.g., cMUT) or other now known or later developed material or technology for transducing between electrical and acoustic energies. Each layer 20, 22, 28 has the same or different size, shape, poling or material. In one embodiment, two bottom layers 20, 22 are PZT blocks and a top layer 28 is a composite of piezoelectric beams and epoxy or other polymer. For example, the two bottom transducer layers 20, 22 are 300 µm thick (range) PZT blocks or solid PZT, and the top layer 28 is a 140 µm thick PVDF-copolymer. The top layer 28 may act as a low impedance matching layer (e.g., 2-4 MRayls) for the bottom two transducer layers 20, 22 (e.g., 30 MRayls). As shown, the top layer 28 is separated from the other transducer layers 20, 22 by one or more matching layers 24. The top layer 28 is diced with the elements 14 or is an undiced sheet of material with patterned electrodes to define the elements. The thickness is selected to provide the desired frequency response, such as receiving in the 6.25 to 8 MHz range of frequencies. In another embodiment, only two transducer layers 20, 22 are provided. In yet other embodiments, the top layer 28 of transducer material is adjacent another transducer layer 22 with no, one or more matching layers 24 between the top layer 28 and the lens 30. The common electrical connection between layers 28 and 22 is grounded or connected with electrical connection 32.

The transducer 12 is operable to generate an acoustic signal having at least first and second different frequency bands in response to a broadband electrical signal provided on an electrical connection 32, 34, 36. For example, the broadband electrical signal, such as half or one cycle square wave or sinusoidal wave with bandwidth covering from below 1 MHz to above 6 MHz, is applied to the top transducer layer 22 on the electrical connection 32 while the electrical connection 36 is grounded. Signals with a greater or lesser bandwidth and/or higher or lower frequency range may be used. The top transducer layer 22 based on thickness, shape, size, material and its relative position to other layers inside transducer along the range direction has a response characteristic to the broadband electrical signal resulting in two or more frequency bands. FIG. 4 shows one possible response characteristic of a single transducer layer 22. Alternatively, two or more layers with same or different electrical connections 32 are used to generate the acoustic energy with two or more frequency bands.

As shown in FIG. 4, the frequency bands are separated from each other, such as by a point at least 6 dB down from peak responses of the first and second frequency bands. FIG. 4 shows a lower frequency band centered or with a peak at about 2 MHz and an upper frequency band centered or with a peak at about 4.25 MHz. About 20 dB or more reduction in response is provided between the two frequency bands. Other response characteristics with two or three or other number of frequency bands provided in response to a broadband electrical signal may be provided. In yet another embodiment, electrical waveform shaping is provided to generate the acoustic signal with the multiple band frequencies. Two signals at different frequencies are substantially simultaneously generated by the element 14 for transmission.

The transmitted acoustic energy propagates through tissue and reflects from structures. The reflected echoes may propagate back to the transducer 12. The propagation and/or reflection in tissue generate harmonic information. In one embodiment, tissue harmonics without any added contrast agent during an imaging session (e.g. 15 minute to one hour examination of a patient with ultrasound) are used for reception and imaging. In other embodiment, added contrast agents, such as microbubbles, are injected into a tissue to be scanned and produce a harmonic response.

The same element 14 receives echoes in response to the transmission. A different combination of transducer layers 20, 22, 28 and/or electrical connections 32, 34, 36 (possible other connections for three or more transducer layer embodiments) are used to receive the echoes. Combinations of transducer layers 20, 22, 28 including or not including one or more layers 20, 22, 28 used for transmit may be used to receive the echoes. The different transducer layers 20, 22, 28 used for transmit or receive may operate with the same or different electrical connections 32, 34, 36.

The echoes include harmonics of the transmitted fundamental frequencies. Harmonics include subharmonics (e.g. ½), fractional harmonics (e.g. 1½) and/or integer harmonics (e.g. the second harmonic). Harmonics also include interaction frequencies, such as the difference and/or sum of two or more transmitted frequencies. In the example transmitting with center frequencies of 2 and 4.25 MHz, the interaction frequencies include 2.25 MHz and 6.25 MHz. The harmonic frequencies include 4 MHz and 8.5 MHz. The bottom transducer layer 20 has a size, shape, thickness and material for receiving at least one of the interaction harmonics. For example, the bottom transducer layer 20 has a spectral response for receiving from about 2.18 MHz to 5 MHz, including the second harmonic of the 2 MHz transmit signal and the difference interaction harmonic. In the embodiment with three transducer layers 20, 22, 28, the top transducer layer 28 has a size, shape, thickness and material for receiving other frequencies, such as the sum interaction harmonic and the second harmonic of the higher transmitted frequency band.

FIG. 5 shows a frequency response characteristic of the bottom transducer layer 20, which is used for reception of the echoes based on the transmission of acoustic energy represented in FIG. 4. The generally smooth and wideband frequency response of the bottom transducer layer 20 allows for reception of multiple harmonic frequency bands, based on the transmitted frequency bands, that may be sufficiently close together to form a wideband composite receive response. For example, less than 3, 6, 10 or other dB down value is provided between the center frequencies of two or more harmonics (e.g., the 2.25 MHz different interaction harmonic and the 4 MHz second harmonic). Greater separation may be provided between the harmonics. Since two or more frequency bands are transmitted, a wideband signal with two or more harmonic frequencies may be received.

The different electrical connections 32, 34, 36 are grounds, cables, traces, wires or other conductors. They may also include ones or groups of discrete or integrated electronic components (e.g. multiplexers, tuning inductors, capacitors, transformers, or preamps, etc.) in parallel or serial connections. Each transducer layer 20, 22 is associated with a different combination of electrodes and associated electrical connections 32, 34, 36. For example, the top transducer layer 22 has electrodes on the top and bottom connected with the electrical connections 32 and 36, respectively. The bottom transducer layer 20 has electrodes on the top and bottom connected with the electrical connections 36 and 34, respectively. A different electrical connection 32, 34, 36 are provided for each of the transducer layers 20, 22 or for each of at least two different combinations of transducer layers 20, 22.

The different electrical connections 32, 34, 36 provide independent electrical access from the transmit beamformer 16 and/or the receive beamformer 18 for each combination of transducer layers 20, 22, allowing independent access for transmit and receive operation. Each element 14 may be wired to multiple system channels, or switching electronics may be positioned at each element 14 to direct transmit and receive signals from the appropriate piezoelectric layer 20, 22, 28 to the system 10. In embodiments with three or more transducer layers 20, 22, 28, other independent electrical connections may be provided and the signals later combined for more wideband operation. Alternatively, two or more layers are electrically connected together with a common electrical connection, such as the bottom and top transducer layers 20, 28 for receiving wideband signals on a same electrical connection.

In FIG. 2, one electrical connection 36 is grounded. A permanent ground or a switchable ground may be provided. In alternative embodiments, the electrical connection 36 switches between operations for transmit and receive. For transmit, a different electrode may be grounded and the electrical connection 36 used for the transmit electrical signal. For receive, a different electrode may be ground and the electrical connection 36 used for receive signals, but still independently of the transmit operation. The electrical connections 32, 34, 36 allow switching between different layers or combinations of layers for transmit and receive operation.

FIG. 3 shows one embodiment of a method for harmonic reception with ultrasound. The method uses the system 10 of FIG. 1, the element 14 of FIG. 2 or different systems or elements. Additional, different or fewer acts may be provided than shown in FIG. 3. For example, the method is provided with the combining act 46.

In act 40, electrical signals are applied to elements of a transducer. The electrical signals are broadband signals, such as square waves generated by a switching network or pulsers. Alternatively, the electrical signals are wave shaped to include information at multiple frequency bands.

In act 42, an acoustic signal is generated in response to the broadband or other input electrical signal. A transducer, such as a transducer layer of multiple layer elements, converts the applied electrical signals into acoustic energy. A set of transducer layers converts the electrical signal into an acoustical signal. The set is one or more transducer layers. For example in the element 14 shown in FIG. 2, one layer only, such as the top or middle layer 22, converts the electrical signal into acoustical energy, and the other layers, such as the bottom layer 20 and/or the top layer 28 are not used for transmit operation.

The conversion from electrical energy to acoustic energy filters the input waveform in one embodiment. For example, the broadband waveform is filtered to provide acoustic energy at two or more different frequency bands. One frequency band is separated from another frequency band by an at least 6 dB, at least 10 dB or at least 20 dB down point from corresponding peak responses of the frequency bands. Greater or lesser separation in magnitude may be provided. The separation in frequency may be small (e.g., about 10-20 percent of the center frequency of the lowest frequency band), large (e.g., at least about 100 percent of the center frequency of the lowest frequency band), or other value. As shown in FIG. 4, two frequency bands with lower and higher center frequencies are provided, such as one center of the lower frequency band within 1-4 MHz and another center of the higher frequency band within 2-8 MHz.

In act 44, echo signals are received. The receiving is performed with a different set of transducer layers than used for transmission in act 42. For example using the element 14 of FIG. 2, the different set is the bottom layer 20 or both the bottom and top layers 20 and 28. One or more transducer layers receive the echo signals, but not at least one transducer layer used for transmission. The acoustic energy may cause all of the layers to generate electrical signals, but only one or a combination of layers in the receive set are used to receive or process the electrical signals. The other layers are grounded or not connected for receiving the electrical energy.

The received echo signals and corresponding received electrical signals include wideband information, such as multiple harmonics of the transmitted frequency bands. The harmonics may include one or more interaction harmonic frequencies of the transmitted frequency bands. Wideband may include other harmonics, such as signals with difference, sum, second harmonic and combinations thereof. For example, the received electrical signals include the difference interaction frequency and/or the second harmonic of the lowest transmitted frequency band from one transducer layer. As another example, the received electrical signals include a sum interaction frequency and/or the second harmonic of the highest transmitted frequency band on a different or the same transducer layer. As yet another example, the received electrical signals include both second harmonics, the sum interaction and the difference interaction frequencies from one or more transducer layers.

The echo signals are free of response from any added contrast agents throughout an imaging session in one embodiment. In other embodiments, the echo signals include harmonic response from contrast agents.

Acts 40, 42, and 44 are repeated. For example, the acts are repeated to scan along different scan lines. As another example, the acts are repeated along a same or similar scan line, but with a different polarity of the transmitted acoustic signals. Different transmit and receive events are provided. Using different polarity, phase, amplitude or combinations thereof for the different events may allow for selective cancellation of fundamental or harmonic frequencies by combining information in act 46. By reversing the polarity between transmit events, the summation of the received signals cancels or reduces odd harmonic components, including the fundamental information, more likely emphasizing the interaction harmonics and even harmonics.

Figure 6:
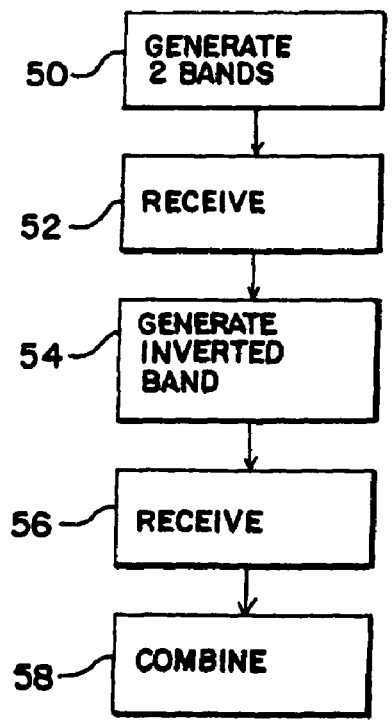
FIG. 6 is a flow chart diagram of another embodiment of a method for harmonic reception with ultrasound.

FIG. 6 shows a different embodiment of a method for harmonic reception with ultrasound. The method uses the system 10 of FIG. 1, the element 14 of FIG. 2 or different systems or elements.

In act 50, an acoustic signal having at least first and second different frequency bands is generated in response to a broadband electrical signal, such as described for act 42. A broadband or other electrical signal is applied to a transducer layer or combination of transducer layers. Alternatively, a single layer element is used.

In act 52, an echo signal is received at a harmonic and/or harmonic interaction frequency of the transmitted frequency bands in response to the transmitted acoustic signal. The same or different layer, combination of layers or single layer is used to convert the echo into an electrical signal.

In act 54, another or subsequent acoustic signal having the one frequency band with reduced or none of another frequency band as compared to the acoustic signal of act 50 is generated. The polarity or phase of the subsequent acoustic signal is inverted or shifted as compared to the acoustic signal of act 50. In alternative embodiments, act 54 is performed prior to act 50. The frequency band used for act 54 is the frequency band with the higher or lower center frequency. Where more than three frequency bands are used, any subset of frequency bands are provided in act 54.

In act 56, an echo signal is receive in response to the acoustic signal of act 54. The received echo and corresponding electrical signal include the fundamental and any harmonic information, with or without interaction harmonics. The same or different layer, combination of layers or single layer from act 54 is used to convert the echo into an electrical signal.

In act 58, the electrical signals received in acts 52 and 56 are combined. A summation, difference, weighted combination or other combination function is used. The combination cancels the fundamental or other selected harmonics of the frequency band used in both of acts 50 and 54, resulting in wideband information that includes interaction harmonics and other harmonics.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for harmonic reception with ultrasound, the method comprising:

generating, with an element having transducer layers stacked along a range dimension, an acoustic signal having at least separate first and second different frequency bands in response to a broadband electrical signal, the generating being without waveform shaping providing the first and second different frequency bands, the acoustic signal generated by a first set of the transducer layers of the element, the first set being one or more of the transducer layers;

receiving an electrical signal at a harmonic and harmonic interaction frequency of the first and second frequency bands, the harmonic and harmonic interaction frequency bands being different, the harmonic interaction frequency being a combination of the first and second frequency bands such that the electrical signal is responsive to the acoustic signal at both the first and second frequency bands, the receiving being performed with a second set of the transducer layers, the second set being one or more of the transducer layers and different than the first set; and imaging as a function of the electrical signal.

2. The method of claim 1 wherein generating comprises generating the acoustic signal with the first frequency band separated from the second frequency band by a down point from first and second peak responses of the first and second frequency bands, respectively, wherein the down point is at least 6 dB.

3. The method of claim 2 wherein the down point is at least 20 dB down.

4. The method of claim 1 wherein generating comprises applying the broadband electrical signal to a first transducer layer of the transducer layers and not a the second transducer layer of the transducer layers, and wherein receiving comprises receiving with the second transducer layer and not the first transducer layer.

5. The method of claim 1 wherein a first center of the first frequency band is within 1-4 MHz and a second center of the second frequency band is within 2-8 MHz, the second center being greater than the first center.

6. The method of claim 1 wherein a first center of the first frequency band is lower than a second center of the second frequency band; and wherein receiving comprises receiving an echo at a difference of the first center from the second center frequency and two times the first center frequency.

7. The method of claim 6 wherein receiving comprises also receiving at a sum of the first and second center frequencies or two times the second center frequency.

8. The method of claim 1 wherein generating and receiving comprise a first event;
further comprising:
repeating the generating and receiving in a second event, the acoustic signal of the second event having a different polarity than for the first event; and
summing the received electrical signal for the first event with the electrical signal for the second event.

9. The method of claim 1 wherein a first transducer layer of the transducer layers comprises a first piezoelectric block and a second transducer layer of the transducer layers comprises a second piezoelectric block, the first transducer layer being a top layer closer to a transmit face;
further comprising a third transducer layer of the transducer layers along the range dimension, the third transducer layer comprising a PVDF-copolymer;
wherein receiving comprises:
receiving, with the second transducer layer, at twice the first frequency band, the difference of the first and second frequency bands, or both twice the first frequency band and the difference of the first and second frequency bands,
receiving, with the third transducer layer, at a sum of the first and second frequency bands, twice the second frequency band or both the sum of the first and second frequency bands and twice the second frequency band, or
receiving with both the second and third transducer layers.

10. The method of claim 1 wherein receiving comprises receiving the echo signal free of response from any added contrast agents throughout an imaging session.

11. A method for harmonic reception with ultrasound, the method comprising:
generating a first acoustic signal having at least first and second different frequency bands in response to a broadband electrical signal without waveform shaping forming the first and second different frequency bands;
receiving a first electrical signal at a harmonic and harmonic interaction frequency of the first and second frequency bands in response to the first acoustic signal, the harmonic and harmonic interaction frequency bands being different, the harmonic interaction frequency being a combination of the first and second frequency bands such that the electrical signal is responsive to the acoustic signal at both the first and second frequency bands;
generating a second acoustic signal having the first frequency band with reduced or none of the second frequency band, the second acoustic signal being inverted from the first acoustic signal at the first frequency band;
receiving a second electrical signal in response to the second acoustic signal; and
combining the first and second electrical signals such that information at the harmonic interaction frequency remains; and
imaging as a function of the combined first and second electrical signals.

12. The method of claim 11 wherein generating the first acoustic signal comprises applying the broadband electrical signal to a first transducer layer of an element having at least the first and a second transducer layers along a range dimension, and wherein receiving the first electrical signal comprises receiving with the second transducer layer.

13. The method of claim 11 wherein the first frequency band has a higher center frequency than the second frequency band.

14. The method of claim 11 wherein the second frequency band has a higher center frequency than the first frequency band.

15. A system for harmonic reception with ultrasound, the system comprising:
a transducer element having at least two transducer layers, the transducer element being part of a transducer;
a first electrical connection with the transducer element;
a second electrical connection with the transducer element, the second electrical connection being for at least one different one of the at least two transducer layers;
the transducer structure to generate an acoustic signal having at least first and second different frequency bands in response to a broadband electrical signal, without waveform shaping forming the first and second different frequency bands, on the first electrical connection, and to receive an echo signal at a harmonic or harmonic interaction frequency of the first and second frequency bands on the second electrical connection, the harmonic and harmonic interaction frequency bands being different, the harmonic interaction frequency being a combination of the first and second frequency bands such that the electrical signal is responsive to the acoustic signal at both the first and second frequency bands.

16. The system of claim 15 wherein the first electrical connection is with a top transducer layer of the transducer element and the top transducer layer has a response characteristic to the broadband electrical signal with the first frequency band separated from the second frequency band by an at least 6 dB down point from first and second peak responses of the first and second frequency bands, respectively.

17. The system of claim 15 wherein a first center of the first frequency band is lower than a second center of the second frequency band, and wherein the harmonic interaction frequency comprises a difference of the first center from the second center frequency.

18. The system of claim 17 wherein the harmonic interaction frequency comprises a sum of the first and second center frequencies.

19. The system of claim 15 wherein first and second transducer layers of the at least two transducer layers comprise first and second piezoelectric blocks, respectively, and a third transducer layer of the at least two transducer layers comprises a piezo-polymer composite or PVDF;
wherein the first electrical connection is with the first transducer layer and the second electrical connection is with the second transducer layer;
further comprising:
a third electrical connection with the third transducer layer, the third transducer layer structured to receive at a sum of the first and second frequency bands and the second transducer layer operable to receive at a difference of the first and second frequency bands.

* * * * *